US006963268B2

(12) United States Patent
Brillon

(10) Patent No.: US 6,963,268 B2
(45) Date of Patent: Nov. 8, 2005

(54) PROCESS FOR THE AUTOMATIC LOCKING OF A VEHICLE FROM AFAR

(75) Inventor: Alain Brillon, Villeneuve Tolosane (FR)

(73) Assignee: Siemens VDO Automotive, Toulouse Cedex (FR)

( * ) Notice: Subject to any disclaimer, the term of this patent is extended or adjusted under 35 U.S.C. 154(b) by 156 days.

(21) Appl. No.: 10/718,647

(22) Filed: Nov. 24, 2003

(65) Prior Publication Data

US 2004/0100392 A1 May 27, 2004

(30) Foreign Application Priority Data

Nov. 22, 2002 (FR) .................................. 02 14635

(51) Int. Cl.[7] .............................................. G05B 19/00
(52) U.S. Cl. ................................ 340/5.72; 340/825.72
(58) Field of Search ............................. 340/5.72, 5.64, 340/5.61, 825.72, 825, 540, 5.1, 10.1, 3, 340/425.5; 341/176; 343/713, 819; 455/134

(56) References Cited

U.S. PATENT DOCUMENTS

| | | | | |
|---|---|---|---|---|
| 5,379,033 | A * | 1/1995 | Fujii et al. | 340/5.64 |
| 5,710,548 | A * | 1/1998 | LeMense | 340/825.69 |
| 6,236,333 | B1 * | 5/2001 | King | 340/5.61 |
| 2001/0038328 | A1 | 11/2001 | King et al. | 340/5.64 |
| 2002/0024427 | A1 | 2/2002 | Banas | 340/425.5 |

FOREIGN PATENT DOCUMENTS

| | | |
|---|---|---|
| FR | 2 700 625 | 7/1994 |
| FR | 2 813 257 | 3/2002 |

* cited by examiner

*Primary Examiner*—Michael Horabik
*Assistant Examiner*—William Bangachon
(74) *Attorney, Agent, or Firm*—Young & Thompson

(57) ABSTRACT

This process relates to a vehicle equipped with a hands-free access system in which the vehicle is equipped with short-range antennas intended to send a signal to a tag. The latter is furnished on the one hand with a receiver for receiving the signals sent by the antennas of the vehicle and on the other hand a transmitter of longer range than the transmitting antennas of the vehicle so as to transmit signals in response to signals received from the vehicle.

16 Claims, 4 Drawing Sheets

PROCESS FOR THE AUTOMATIC LOCKING OF A VEHICLE FROM AFAR

Figure 1:
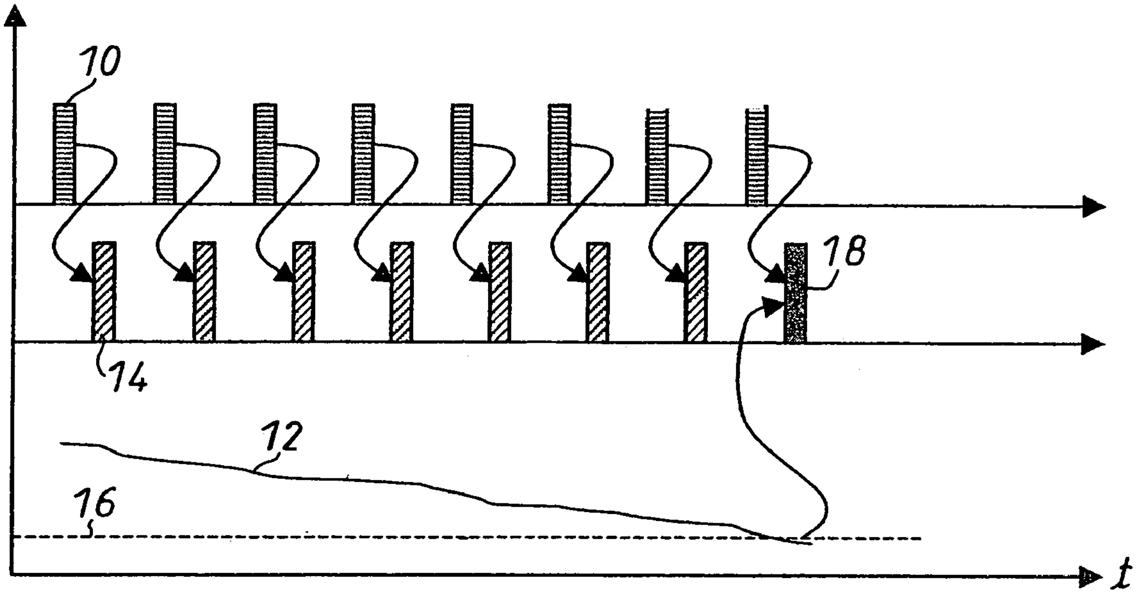

The present invention relates to a process for the automatic locking of a vehicle from afar. Such a process is implemented in particular in a vehicle equipped with a hands-free access system.

A hands-free access system makes it possible to circumvent the use of a mechanical key to access a motor vehicle. The person wishing to access the vehicle must then be furnished with a tag that he/she can keep in a pocket. The mere fact of approaching the vehicle and of grasping a handle thereof then instructs the unlocking of the vehicle. In practice an exchange of electromagnetic signals is carried out between the tag and the vehicle. The vehicle transmits signals called LF (standing for low frequency) signals of a frequency generally of the order of 125 kHz so as to detect the presence of a tag. The latter is furnished with a corresponding receiver and, when it receives a signal transmitted by the vehicle, it responds thereto by the transmission of a so-called RF (standing for radio frequency) signal generally of a frequency of the order of 433 MHz. Processes known to the person skilled in the art make it possible to identify the tag and to locate it. So, as a function of the tag and of its location, the person carrying this tag will be able, if certain conditions are fulfilled, to access the vehicle by simply grasping a handle thereof, start the vehicle, lock the vehicle, etc.

The present invention relates more particularly to a hands-free system when the latter is in the vehicle locking phase. It is currently known, in order to carry out the automatic locking of a vehicle, to carry out a bi-directional dialog between the tag and the vehicle in radio frequency, that is to say with a frequency of 433 MHz and a relatively long range for the signals in both directions (of the order of about ten meters to a few meters). When the tag then goes out of the transmission range of the RF transmitter of the vehicle, the locking of the latter is instructed. This technology has drawbacks since the range of the RF signals transmitted by the vehicle is poorly controlled. Specifically, this range depends strongly on the environment of the vehicle. Thus, a mechanical construction in proximity to the vehicle may very substantially influence the range of the RF waves transmitted.

Another drawback of such a process is that if an RF transmission from the tag toward the vehicle is disturbed (by interference) the vehicle regards the tag as having gone out of range of the RF antennas of the vehicle and a locking of the vehicle may be instructed. Thus for example if a child is playing inside the vehicle with a tag and removes the power supply battery from the tag, the latter no longer responds to the vehicle's demands and is regarded as out of range, thus instructing locking of the vehicle.

An aim of the present invention is thus to provide a process for automatic locking exhibiting increased reliability. Such a process will preferably have to prevent locking of the vehicle when the tag is not moving away from the latter.

For this purpose, it proposes a process for the automatic locking from afar of a vehicle equipped with a hands-free access system in which the vehicle is equipped with short-range antennas intended to send a signal to a tag furnished on the one hand with a receiver for receiving the signals sent by the antennas of the vehicle and on the other hand a transmitter of longer range than the transmitting antennas of the vehicle for transmitting signals in response to signals received from the vehicle.

According to the invention, the locking of the vehicle is instructed when on the one hand the doors of the vehicle to be locked are closed and when on the other hand the vehicle receives from the tag a signal containing a cue indicating that the level of reception by the tag of the signals transmitted by the vehicle is low or zero, at least one signal sent previously by the vehicle having been received with a normal level of reception.

In this way, locking is instructed only in the case where the vehicle receives a signal from the tag. If this signal is disturbed, locking is not carried out. The normal level of reception is not defined here numerically. It is a level which under ordinary conditions makes it possible to receive and to recognize a signal. The reception level is regarded as normal in particular when the tag is in the zone of coverage of an antenna.

The signals transmitted by the antennas of the vehicle for the implementation of this process are advantageously signals of low frequency (or LF) type, of a frequency of the order of 125 kHz. These signals are already used in most hands-free access systems from the vehicle to the tag. It is therefore unnecessary to make provision for additional components for communication from the vehicle to the tag. The use of the low frequency for sending signals to the tag is also preferable since signals of this type are less susceptible to being disturbed than the radio frequency type signals ordinarily used by the hands-free systems of the prior art implementing a procedure for automatic locking of the vehicle from afar. The use of LF type signals also makes it possible to carry out better location of the tag, this proving to be very useful in an automatic locking process.

The signals transmitted by the tag for the implementation of this process are for their part preferably signals of radio frequency type, of a frequency of the order of 433 MHz.

To prevent locking of the vehicle in the case where the tag is only very temporarily moving away from the vehicle, provision may be made for a timeout to be provided between the sending by the tag of the signal containing a cue relating to the low level of reception of the signals originating from the vehicle and the instruction to lock the vehicle.

In a preferred embodiment, the tag implemented in respect of a process according to the invention is furnished with a device allowing it to measure the amplitude of the signal received originating from the vehicle.

In this embodiment, a first case provides that each signal transmitted by the tag indicate the amplitude of the last signal received originating from the vehicle. Another case provides that the tag transmit toward the vehicle a first type of signal in response to a signal transmitted by the vehicle when the amplitude of the signal received is greater than a predetermined threshold and that the tag transmit toward the vehicle a second type of signal different than the first, in the converse case. In the latter case, the signal of the second type is preferably not sent when an abrupt variation in the signal amplitude measured is detected. Specifically, such a variation may be due to an anomaly and it is then preferable not to lock the vehicle. A warning, for example audible, can then be provided so as to attract the vehicle driver's attention.

In the case in particular where the person carrying the tag goes right around his/her vehicle, it is necessary to prevent the tag from being regarded as moving away from the vehicle when it goes out of the zone of coverage of an outside transmitting antenna of the vehicle and subsequently enters the zone of coverage of another outside transmitting antenna. The locking process according to the invention then proposes that, insofar as the tag is equipped with means making it possible to measure the amplitude of the field of the signals received, when the tag receives several signals originating from several antennas of the vehicle, it takes into account the signal whose amplitude is the largest.

The tag advantageously transmits an alert in the case where an anomaly is detected in the measurement of the amplitude of the signals received. The carrier of the tag is thus warned of a malfunction at the vehicle locking phase level.

In another embodiment of the process according to the invention, the tag periodically sends a first type of signal in response to an interrogation by a signal originating from the vehicle, and the tag continues to transmit when it no longer receives the vehicle's interrogations but then sends signals of a second type indicating that it has not received any signal originating from the vehicle since the last signal that it transmitted. After reception of a signal of the second type, after a possible timeout, a locking command can be given.

In a locking process according to the invention, it is preferable that when the tag leaves the zone of coverage of the outside antennas it does so in order to move away from the vehicle and not in order to re-enter the vehicle, for example through a window that is ajar. During the implementation of the locking process, at least one antenna transmitting signals in such a way as to substantially cover the entire inside space of the vehicle then advantageously sends a signal toward the tag, and the locking of the vehicle is carried out only if the tag receives the signal originating from an inside antenna. To prevent the risks of disturbance of the signals transmitted by the inside antennas, the transmission of the inside antennas is performed for example at full power, and this transmission is carried out after a predetermined time span subsequent to the exiting of the tag from the outside coverage zone.

Still with the aim of preventing the automatic locking of the vehicle because the system believes that the tag is moving away from the vehicle whereas it is in fact inside the latter, the tag preferably transmits a signal containing a cue indicating that the level of reception by the tag of the signals transmitted by the vehicle is low or zero only insofar as it has not responded for a predetermined minimum time to a demand from the inside antennas.

Figure 2:
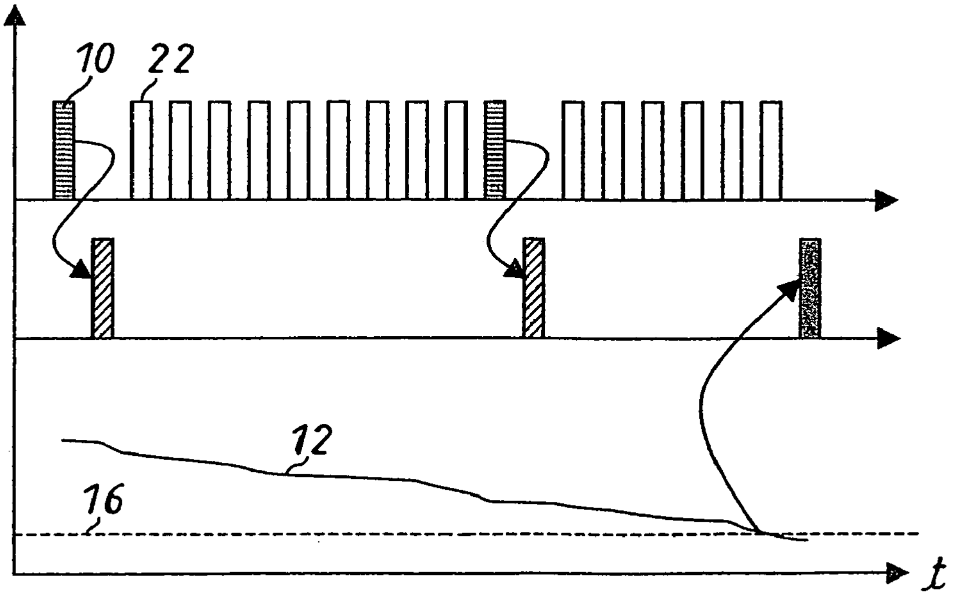
Figure 3:
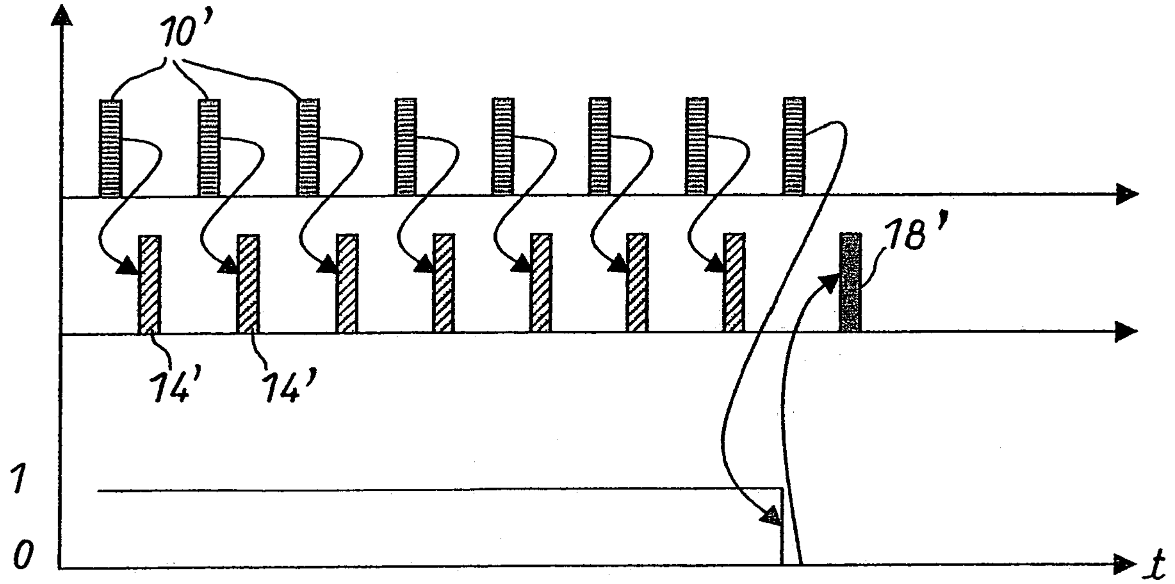
Figure 8:
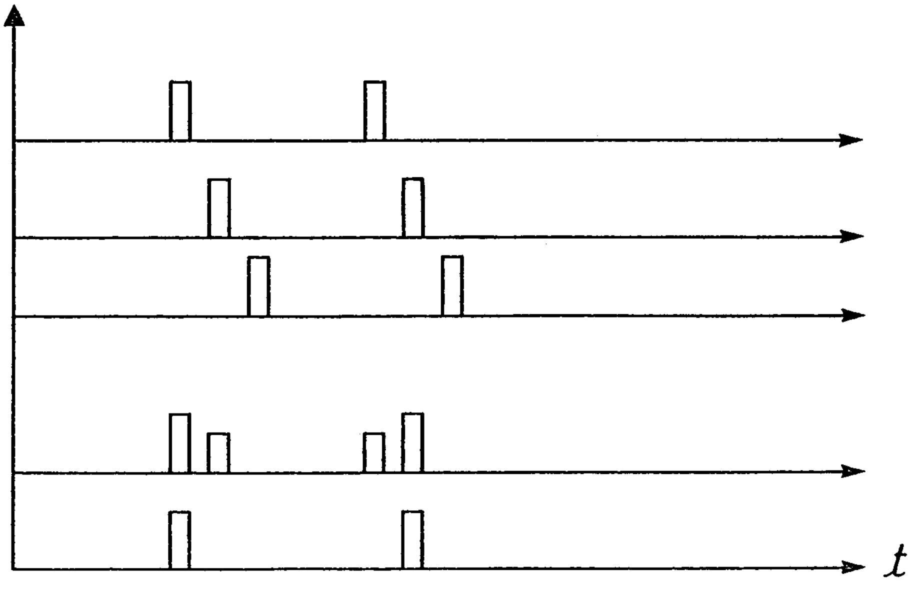
Figure 4:
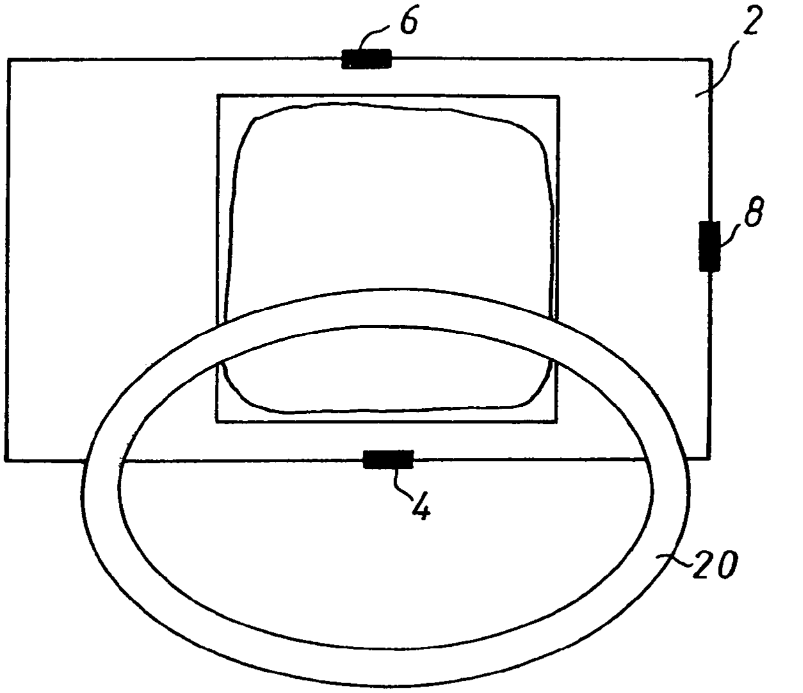
Figure 5:
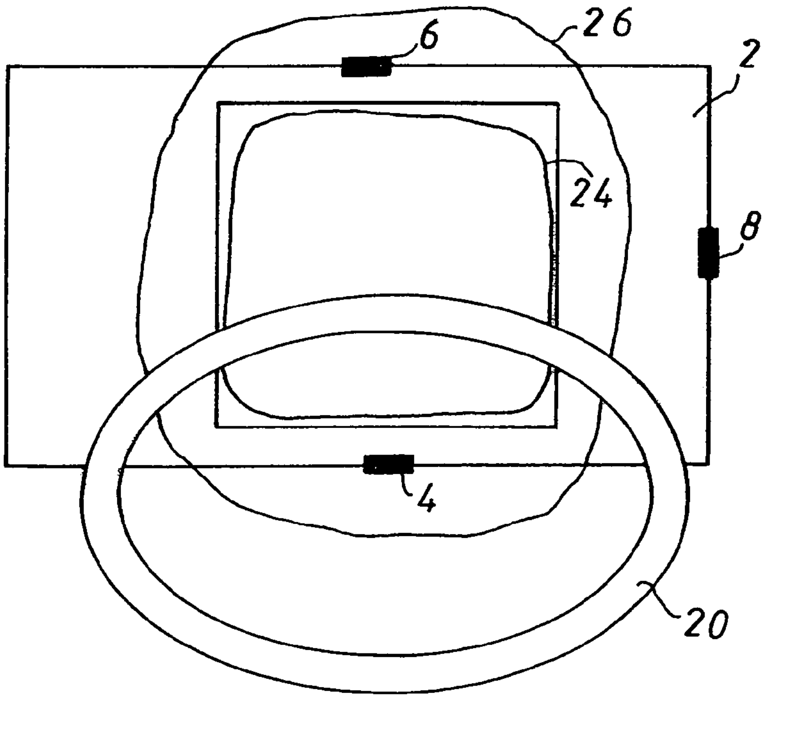
Figure 6:
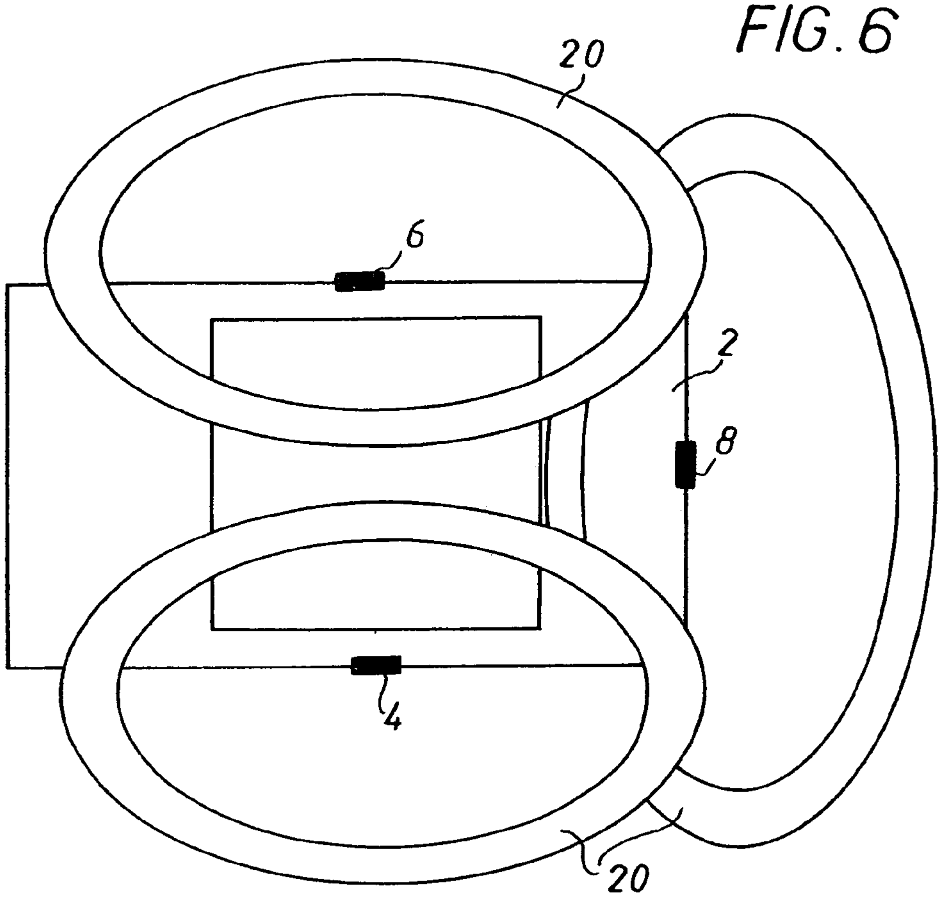
Figure 7:
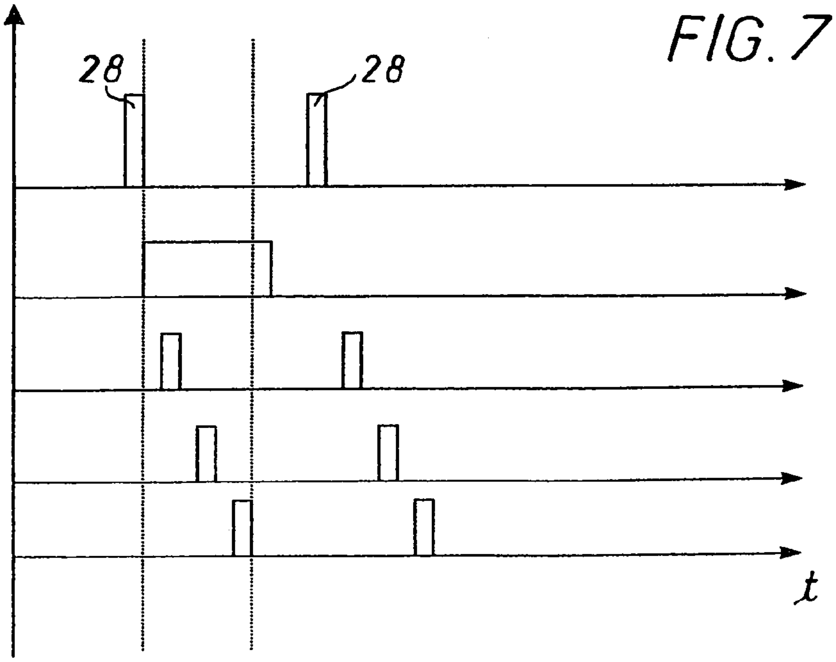

Details and advantages of the invention will be further apparent from the following description, given with reference to the appended diagrammatic drawing, in which:

FIG. 1 diagrammatically illustrates a dialog between a vehicle and a corresponding tag according to a first embodiment according to the invention, FIG. 2 corresponds to FIG. 1 for a variant embodiment of this first embodiment of a process according to the invention, FIG. 3 corresponds to FIG. 1 for a second embodiment of a process according to the invention, FIGS. 4 to 6 diagrammatically show in plan view a motor vehicle and the transmission zones of various transmitting antennas mounted on this vehicle, and FIGS. 7 and 8 illustrate the signals transmitted by the antennas of the vehicle so as to illustrate advantageous variants of a locking process according to the invention.

FIGS. 4 to 6 very diagrammatically represent a vehicle 2 equipped with a hands-free access system. It is thus possible to open a locked door of this vehicle without having to use a mechanical key. It suffices that the person attempting to open the door be furnished with an access tag (not represented in the drawing) that is recognized and accepted by the hands-free system of this vehicle. Such a tag may as a non-limiting example take the form of an electronic card with a format much like that of a credit card. In order for the vehicle to be able to identify the tag, there is provision, in a known manner, to carry out a dialog by exchanging encoded electromagnetic signals. The vehicle 2 communicates with the tag by sending LF (standing for low frequency) type signals while the tag responds by sending RF (standing for radio frequency) signals. Thus, the vehicle 2 is equipped with LF transmitters and with an RF receiver whereas the tag is equipped with an LF receiver and with an RF transmitter. Conventionally the frequency used for the LF and RF signals respectively is 125 kHz and 433 MHz respectively.

The range of the LF antennas is of the order of a meter (for example 1.50 m) whereas the range of the RF signals is conventionally of the order of a few tens of meters (varying according to the environment as indicated in the preamble). In order to detect the presence of a tag in proximity to and outside the vehicle 2, the latter is equipped for example with three transmitting antennas: a first LF antenna 4 is integrated into a left door of the vehicle, a second LF antenna 6 is integrated into a right door of the vehicle whereas the third LF antenna 8 is integrated into the rear door of the vehicle (or depending on the type of vehicle into the latter's trunk).

Represented diagrammatically in FIG. 1 is a dialog between the LF antenna 4 and a tag. The hands-free system is in a door locking phase. The following case holds for example: the driver of the vehicle 2 has just turned off the engine and the occupants of the vehicle are getting out of the latter, closing their door behind them. The driver carries his tag in a pocket. When all the doors are closed, the LF antenna 4 transmits a first LF frame 10 toward the tag. In FIG. 1, just as in FIGS. 2 and 3, the first line symbolizes the LF frames transmitted by an antenna of the vehicle, the second line symbolizes the RF frames transmitted by the tag while represented at the bottom of the figure is a cue relating to the level of reception by the tag of the signals transmitted by the corresponding LF antenna. In these charts, the time axis has been plotted as abscissa.

In a first embodiment (FIGS. 1 and 2), it is assumed that the tag is furthermore equipped with a device allowing it to measure the amplitude of the LF signals that it receives.

When the tag receives the first frame 10 originating from the LF antenna 4, the amplitude of the signal received by the tag is large as shown by the curve 12, since the driver and hence the tag are still in proximity to the LF antenna 4. The tag then responds with an RF frame 14.

While the tag is moving away from the LF antenna 4, the latter continues to periodically transmit frames similar to the frame 10. The tag then responds with frames similar to the frame 14 while the LF signal amplitude received by the tag remains above a predetermined threshold symbolized in FIGS. 1 and 2 by a dashed line 16. This predetermined level is hereinafter called the "detection threshold".

When the tag, after having sent several frames 14, receives an LF signal of an amplitude below the detection threshold, it sends a frame 18 which carries as cue the fact that the last LF frame received was received with a level of reception below the detection threshold. When this RF frame 18 is then received by the RF receiver of the vehicle the latter deduces therefrom that the tag is in the zone 20 represented in FIG. 4. A locking instruction command can then be sent.

It is appreciated that locking can therefore not occur subsequent to a disturbance of the RF transmission. Specifically, the vehicle must receive an RF frame such as the frame 18, together with a cue indicating that the tag is in the zone 20, in order for a locking command to be issued.

To avoid untimely locking subsequent to a disturbance of an LF transmission of the LF antenna 4, the tag monitors the level of reception of the signal that it receives from the LF antenna 4 and thus notes the decreasing of the amplitude of the signal when the tag moves away from this LF antenna 4. In the case of an abrupt disappearance of the LF signal, the tag sends no frame 18. There is therefore no locking of the vehicle. The tag noting an abrupt disappearance of the LF signals can also signal same, for example through an audible warning.

So that the decreasing of the level of reception of the LF signal can be measured with fairly high accuracy and with a response time compatible with the moving away of the tag, it is preferable for the period of the interrogation effected by the LF antennas to be as small as possible so as to accommodate in particular the case of a rapid moving away of the tag. The sending of numerous signals by the LF antennas then results in a large number of responses from the tag. These numerous responses will be demanding on the power supply cell which will discharge rapidly.

To limit this effect, provision may be made for the LF transmitting antennas to transmit two types of frame (cf FIG. 2). A first type of frame 10 corresponds to the frames 10 of FIG. 1. The signal thus transmitted contains a request asking the tag to dispatch a response. A second type of frame 22 corresponds to a frame 10 but contains no request asking for the sending of a response. In FIG. 2, it has been assumed that only one frame out of ten sent by the vehicle was a frame 10 demanding a response from the tag. Despite sending no response to the vehicle, the tag nevertheless measures the level of reception of the LF frames 22. It can be assumed, as represented in FIG. 2, that a frame 18 is transmitted by the tag as soon as an LF frame 10 or 22 is received by the tag with a level of reception below the detection threshold.

A timeout may be provided for after the sending of a frame 18 indicating that the tag is in the zone 20 so that the sending of the frame 18 is prevented from immediately instructing locking. Thus in the case where the tag were to come back inside the space delimited by the zone 20, that is to say into a space close to the vehicle 2 in which the level of reception of the LF signals is above the detection threshold 16, slightly after the sending of the frame 18, the vehicle would not lock.

As an option, the locking process proposes that when a tag remains in proximity to the vehicle, to confirm the presence of this tag frames are sent from time to time asking for a response from the tag. Provision may be made for example for one frame out of ten to be sent asking for a response. If no response is sent, after one or more demands from the vehicle, this signifies that no dialog is possible any longer between the vehicle and any tag of the system. Automatic locking from afar cannot therefore be effected in that case. Provision may advantageously be made for an audible alert for signalling to the driver the absence of dialog and the non-locking of the vehicle.

As represented in FIG. 3, the outside LF antennas 4, 6 and 8 cover a space on the sides and to the rear of the vehicle in which a tag receives the signals transmitted by these LF antennas with a sufficient level of reception, that is to say one which is above the detection threshold 16. It is preferable that a driver who, with a tag in his/her pocket, is going right around his/her vehicle, be prevented from causing the locking of the vehicle when going from the transmission zone of one antenna to the transmission zone of another antenna.

To prevent locking of the vehicle in this case, the LF antennas 4, 6 and 8 successively transmit frames toward the tag as represented in FIG. 8. In this figure, the first line diagrammatically represents a frame sent by the LF antenna 4, the second line the frames sent by the antenna 8 and the third line the frames sent by the antenna 6. It is then appreciated that a signal is firstly sent by the LF antenna 4, then by the LF antenna 8 and finally by the LF antenna 6. Such a transmission cycle is repeated periodically. FIG. 8 illustrates the passing of a tag from the zone covered by the LF antenna 4 to the zone covered by the LF antenna 8. The carrier of the tag thus moves for example from the door of his/her vehicle to its trunk. In this case, he/she will leave the zone covered by the LF antenna 4 on the left side of the vehicle and enter the zone covered by the LF antenna 8 of the trunk. These two zones exhibit a common part. When this tag is in a space common to two zones covered by two separate antennas, it receives the signals from the two corresponding LF antennas 4 and 8. The fourth line of FIG. 8 represents the signals received by the tag. The size of the signals is representative of the signal reception level. It is therefore appreciated that, initially, reception by the tag of the signals transmitted by the LF antenna 4 is not so good for the signals transmitted by the LF antenna 8. Subsequently the converse holds: reception by the tag of the signal transmitted by the LF antenna 8 of the trunk is better than for that transmitted by the LF antenna 4 on the left side. By virtue of the field measurement, the tag thus considers the signal that it receives with the better level of reception. The fifth line shows the signal retained by the tag. It is appreciated that initially it retains the signal transmitted by the LF antenna 4 while subsequently it retains the signal transmitted by the LF antenna 8 of the trunk. Such processing of the signals thus allows the transmission of a frame 18 indicating that the tag is in a zone 20 and therefore makes it possible to prevent untimely locking of the vehicle.

In this first embodiment described above, it has been assumed that the tag was analysing the reception levels that it measured so as to determine whether or not it had to send a frame 18 to the vehicle to indicate that it is in the zone 20 exiting the space covered by the corresponding LF antenna. Thus the vehicle locking decision is taken essentially at the tag level. In a variant embodiment it is possible to take the decision at the vehicle level. In this case, provision may be made for the RF frames transmitted by the tag to contain a cue indicating the level of reception of the LF signals received. For the variant embodiment represented in FIG. 2, the RF frame transmitted can be regarded as containing not only as cue the level of reception of the last LF frame received but also the level of reception of all the LF frames received since the last transmission of an RF frame. All the information necessary for deciding whether to send a locking command is then available to the vehicle 2.

FIG. 3 illustrates a second embodiment in respect of a process according to the invention. Represented diagrammatically in this FIG. 3, just as in FIGS. 1 and 2, are frames 10' transmitted by an outside LF antenna of the vehicle and, on a second line, RF frames transmitted by the tag. Beneath these two lines, the level of reception of the LF signals by the tag is represented. In the case where the signal received has a sufficient amplitude for good processing, the reception level takes the value 1 and, in the converse case, it takes the value 0. In this second embodiment of a process according to the invention, there is no measurement of the field of the signal received by the tag.

Here, as represented in the first line of FIG. 3, the vehicle periodically transmits LF signals 10' toward the tag. The tag responds to the vehicle with a frame 14' signifying that it has received the LF message with a reception level equal to 1. The tag stores in memory the fact that it is periodically interrogated by the vehicle. In case of disappearance of this interrogation, the tag will continue to transmit an RF signal toward the vehicle. However, this signal, bearing the reference 18', conveys a modified message as compared with the message of the signal 14'. The content of this new message signals to the vehicle that no reception of LF message has been performed by the tag since the last RF transmission. Thus, the vehicle seeing that the tag is no longer receiving its LF requests can deduce therefrom that the tag has left the zones covered by its outside antennas and that the RF dialog is still possible, that is to say not disturbed by interference.

The signal 18' indicating the absence of reception of an LF signal can be sent just once, or preferably several times. The sending of several signals 18' makes it possible to confirm that the tag is far away from the vehicle.

As in the first embodiment, it is appreciated that it is necessary here for the vehicle to receive an RF signal from the tag in order for the locking of the vehicle to be possible. The RF interference or a break in communication can therefore no longer cause untimely locking of the vehicle.

In this case also it is possible to provide for a timeout between the moment at which the frame 18' is emitted and the instruction for actual locking of the vehicle. Specifically, if the tag re-enters the zone covered by an outside antenna 4, 6 or 8 of the vehicle 2 it is unnecessary to lock the vehicle.

In both embodiments described above (FIGS. 1 to 3) it is necessary to prevent the tag, during a vehicle locking phase, from leaving a zone covered by an outside antenna in order to re-enter the vehicle and thus cause the locking thereof. Specifically, the external LF antennas 4, 6 and 8 also cover a part of the inside of the vehicle as represented in FIGS. 4 to 6. It is necessary to prevent the system from being made to believe that the tag is leaving the proximity of the vehicle whereas it is re-entering the latter.

So, to be sure that the tag is not inside the vehicle, use is made of the inside coverage generally provided for in a hands-free system. Specifically, just as there are external LF antennas 4, 6 and 8, the vehicle exhibits internal LF antennas that generally cover the inside of the cabin of the vehicle. So, to be certain that the tag is not inside the vehicle, the hands-free system activates the inside antennas. In case of absence of response to the demands of the inside antennas, it is assumed that the tag is outside the vehicle.

To limit the risk of LF communication problems during interrogation by the inside antennas, the interrogation done by the inside antennas can be done in strong field mode. In this case, the zone of reception of the LF signal transmitted by the inside antennas of the vehicle spills over to the outside of the vehicle while nevertheless remaining limited to a zone of the order of a few tens of centimeters around the vehicle. FIG. 5 represents a first contour 24 delimiting the zone of “normal” coverage of the inside antennas as well as a second contour 26 delimiting the zone of reception when the inside antennas transmit at full power. In certain hands-free systems, such as the one with which the vehicle represented in the drawing is equipped, the transmission power of the inside antennas is deliberately limited so as to prevent spillover of the LF signal to the outside of the vehicle.

Provision may thus be made, in order to be certain that no tag is inside the vehicle, to make a search for the tag inside the vehicle by sending an LF request by way of the inside antennas. A first signal can be transmitted just after the closure of the last door. The signal is effected at “normal” power, that is to say avoiding the spillover of the signal out of the cabin of the vehicle. Specifically, just after the closure of the last door, there is a possibility that the tag might still be in proximity to the vehicle. An interrogation by the inside antennas at full power would therefore possibly detect the tag. On the other hand, when the tag reaches the zone 20, an interrogation at full power (contour 26) can be carried out by the inside antennas. It is thus possible to determine more reliably whether the tag is indeed outside the vehicle and not inside it.

In the case where an interrogation is effected by the inside antennas and the tag is located by these inside antennas, the tag advantageously stores that it is has received an LF frame originating from the inside antennas, as is illustrated in FIG. 7. In this figure the first line diagrammatically represents frames 28 corresponding to LF requests from inside antennas of the vehicle. This request can be made at full power. The second line of FIG. 7 symbolizes the time interval during which the tag stores that it has received a request 28 from an inside antenna. The last three lines each correspond to an outside LF antenna. As already indicated earlier, these antennas transmit requests successively and not simultaneously. Just as for FIGS. 1 to 3 and FIG. 8, the time is plotted as abscissa. It is appreciated in FIG. 7 that the timeout is longer than the time required for each of the outside antennas to send a request to the tag. Thus, to circumvent radio frequency disturbances, an RF frame of type 18 or 18' will be returned by the tag only if the latter has not been located by the inside coverage for a minimum time. If it is assumed that the tag has received the first request 28 made by the inside antennas and represented in FIG. 7, then no frame of type 18 or 18' will be transmitted by the tag throughout the duration of the timeout.

In the description given with reference to FIG. 7, it matters little whether the tag responds or does not respond to the request transmitted by the inside antennas. It is sufficient that the tag should store the fact that it has received a request from the inside antennas.

The above-described locking processes according to the invention thus have the advantage firstly of not being disturbed by RF interference. Specifically, in all cases, it is necessary for the tag to send a signal with a particular cue in order for it to be possible to trigger a locking instruction. The absence of sending of an RF signal does not allow the vehicle to be locked.

Another advantage of the processes described above is that they use an LF-RF dialog to carry out the locking of the vehicle. The use of LF signals from the vehicle to the tag allows better locating of the latter. Specifically, the LF electromagnetic signals essentially create a magnetic field that decreases rapidly as a function of distance and is thus less susceptible to disturbance by the environment than RF signals.

These locking processes, by virtue in particular of the use of an LF-RF dialog, can accommodate virtually all existing hands-free systems since the latter already use such a mode of communication between the vehicle and the tag. It is thus possible to make provision through software for numerous typical cases without modifying the existing structure. Provision may for example be made to lock the vehicle even if there is still a tag inside the latter. The tag inside the vehicle is then disabled in a known manner.

The present invention is not limited to the embodiments and to their variants described above by way of non-limiting examples. It also relates to other variant embodiments within the scope of the person skilled in the art, within the context of the claims hereinbelow.

What is claimed is:

1. A process for the automatic locking from afar of a vehicle (2) equipped with a hands-free access system in which the vehicle is equipped with short-range antennas (4, 6, 8) intended to send a signal to a tag furnished with a receiver for receiving the signals sent by the short-range antennas (4, 6, 8) of the vehicle and a transmitter of longer range than the short-range antennas (4, 6, 8) of the vehicle for transmitting signals in response to signals received from the vehicle which comprises;

instructing the locking of the vehicle when the doors of the vehicle to be locked are closed and when the vehicle receives from the tag a signal (18, 18') containing a cue indicating that the level of reception by the tag of the signals (10, 10', 22) transmitted by the vehicle (2) is low or zero, with at least one signal sent previously by the vehicle (2) having been received with normal level of reception.

2. The locking process as claimed in claim 1, characterized in that the signals transmitted by the short-rang antennas (4, 6, 8) of the vehicle for the implementation of this process are signals of low frequency of the order of 125 kHz.

3. The locking process as claimed in claim 1, characterized in that the signals transmitted by the tag for the implementation of this process are signals of radio frequency of the order of 433 MHz.

4. The locking process as claimed in claim 1, characterized in that a timeout is provided between the sending by the tag of the signal (18, 18') containing a cue relating to the low level of reception of the signals originating from the vehicle and the instruction to lock the vehicle.

5. The locking process as claimed in claim 1, characterized in that the tag is furnished with a device allowing it to measure the amplitude of the signal received originating from the vehicle.

6. The locking process as claimed in claim 5, characterized in that each signal (14, 14', 18, 18') transmitted by the tag indicates the amplitude of the last signal received originating from the vehicle.

7. The locking process as claimed in claim 5, characterized in that the tag transmits toward the vehicle a first type of signal (14) in response to a signal transmitted by the vehicle when the amplitude of the signal received is greater than predetermined threshold and that the tag transmits toward the vehicle a second signal (18) different than the first, in the converse case.

8. The locking process as claimed in claim 7, characterized in that the second signal (18) is not sent when abrupt variation in the signal amplitude measured detected.

9. The locking process as claimed in claim 5, characterized in that when the tag receives several signals (10, 20) originating from several antennas (4, 6, 8) of the vehicle it takes into account the signal whose amplitude is the largest.

10. The locking process as claimed in claim 5, characterized in that the tag transmits an alert in the case where an anomaly is detected in the measurement of the amplitude of the signals received.

11. The locking process as claimed in claim 1, characterized in that the tag periodically sends a first signal (14') in response to an interrogation by a signal (10') originating from the vehicle, and in that the tag continues to transmit when it no longer receives the vehicle's interrogations but then sends a second signal (18') indicating that it has not received any signal originating from the vehicle since the last signal that it transmitted.

12. The locking process as claimed in claim 1, characterized in that, during the implementation of the locking process at least one antenna transmitting signals in such a way as to substantially cover the entire inside space of the vehicle sends a signal toward the tag, and in that the locking of the vehicle is carried out only if the tag receives the signal originating from an inside antenna.

13. The locking process as claimed in claim 12, characterized in that the transmission of the inside antennas is performed at full power, and in that this transmission is carried out after a predetermined time span subsequent to the closure of all the doors of the vehicle.

14. The locking process as claimed in claim 12, characterized in that the tag transmits a signal containing a due indicating that the level of reception by the tag of the signals transmitted by the vehicle is low or zero only insofar as it has not responded for a predetermined minimum time to a demand from the inside antennas.

15. The locking process as claimed in claim 2, characterized in that the signals transmitted by the tag for the implementation of this process are signals of radio frequency of the order of 433 MHz.

16. The locking process as claimed in claim 13, characterized in that the tag transmits a signal containing a cue indicating that the level of reception by the tag of the signals transmitted by the vehicle is low or zero only insofar as it has not responded for a predetermined minimum time to a demand from the inside antennas.

* * * * *